(12) United States Patent
Krispin

(10) Patent No.: US 10,133,548 B2
(45) Date of Patent: Nov. 20, 2018

(54) SYSTEM AND METHOD FOR PROVIDING MOBILE PERSONAL SECURITY PLATFORM

(71) Applicant: Roadwarez Inc., Lakewood, NJ (US)

(72) Inventor: Yeshaya Krispin, Lakewood, NJ (US)

(73) Assignee: ROADWAREZ INC., Lakewood, NJ (US)

( * ) Notice: Subject to any disclaimer, the term of this patent is extended or adjusted under 35 U.S.C. 154(b) by 0 days.

(21) Appl. No.: 15/393,292

(22) Filed: Dec. 29, 2016

(65) Prior Publication Data

US 2017/0108878 A1    Apr. 20, 2017

Related U.S. Application Data

(63) Continuation-in-part of application No. 15/113,831, filed as application No. PCT/IB2015/050567 on Jan. 26, 2015.

(Continued)

(51) Int. Cl.
*B62J 3/00* (2006.01)
*G06F 3/16* (2006.01)
(Continued)

(52) U.S. Cl.
CPC .......... *G06F 3/167* (2013.01); *B64C 39/024* (2013.01); *B64D 47/08* (2013.01); *G01S 19/13* (2013.01);
(Continued)

(58) Field of Classification Search
CPC ........ G05D 1/12; G05D 1/102; B64C 39/024; B64D 47/08; G01S 19/13; G08B 5/002;
(Continued)

(56) References Cited

U.S. PATENT DOCUMENTS 3,985,131 A    10/1976    Buck et al.
4,924,862 A    5/1990    Levinson
(Continued)

FOREIGN PATENT DOCUMENTS

ES    2361549 A1    6/2011
ES    2416579 A1    8/2013
WO    2012151642 A1    11/2012

*Primary Examiner* — Kerri McNally
*Assistant Examiner* — Thang Tran
(74) *Attorney, Agent, or Firm* — AlphaPatent Associates, Ltd; Daniel J. Swirsky

(57) ABSTRACT

The present disclosure relates to a personal security platform. In particular, the present disclosure relates to such systems designed to be worn or attached to one's garment during use to provide safety and security measures and help if facing hostility, aggression, harassment, or any other emergency situation mostly while in an outdoor activity such as biking, jogging, walking, usage of any open vehicle and the like. Additionally, another aspect of the security platform is protecting users of open vehicles, where a signaling system is provided, comprising a vest or a wearable item having a rear-facing display, a controller and optionally, a front-facing display. The vest is configured to communicate with the controller for operating the display. The controller is configured to operate the display based at least on data from a GPS module and one or more motion sensors.

16 Claims, 10 Drawing Sheets

Related U.S. Application Data

(60) Provisional application No. 61/965,255, filed on Jan. 27, 2014, provisional application No. 62/075,914, filed on Nov. 6, 2014, provisional application No. 62/273,480, filed on Dec. 31, 2015.

(51) Int. Cl.

| | | |
|---|---|---|
| *H04B 1/3827* | (2015.01) | |
| *G08B 5/00* | (2006.01) | |
| *G08B 25/01* | (2006.01) | |
| *B64C 39/02* | (2006.01) | |
| *G01S 19/13* | (2010.01) | |
| *B64D 47/08* | (2006.01) | |
| *G05D 1/10* | (2006.01) | |
| *H04N 5/232* | (2006.01) | |
| *H04W 4/90* | (2018.01) | |
| *G06F 1/16* | (2006.01) | |
| *G06F 3/048* | (2013.01) | |

(52) U.S. Cl.
CPC ............ *G05D 1/102* (2013.01); *G06F 1/163* (2013.01); *G08B 5/002* (2013.01); *G08B 25/012* (2013.01); *G08B 25/016* (2013.01); *H04B 1/385* (2013.01); *H04N 5/23206* (2013.01); *H04W 4/90* (2018.02); *G06F 3/048* (2013.01)

(58) Field of Classification Search
CPC .... G08B 25/012; G08B 25/016; H04B 1/385; H04N 5/23203; H04N 5/23206; H04W 4/22; H04W 4/90; G06F 3/048; G06F 3/167
USPC .......................................................... 340/432
See application file for complete search history.

(56) References Cited

U.S. PATENT DOCUMENTS

| | | | |
|---|---|---|---|
| 5,664,560 A | 9/1997 | Merrick et al. | |
| 6,634,356 B1 | 10/2003 | O'Dea et al. | |
| 9,116,667 B1* | 8/2015 | St. Louis | G06F 1/163 |
| 2002/0145864 A1* | 10/2002 | Spearing | A41D 13/01 362/103 |
| 2003/0055557 A1* | 3/2003 | Dutta | B60R 25/1001 701/532 |
| 2003/0213045 A1* | 11/2003 | Fuentes | A41D 13/01 2/69 |
| 2005/0104741 A1* | 5/2005 | Kimbrough, Jr. | A41D 13/01 340/815.45 |
| 2005/0111174 A1* | 5/2005 | Jordan | G09F 21/02 361/679.03 |
| 2006/0220922 A1* | 10/2006 | Brinton | G07C 5/085 340/988 |
| 2006/0291193 A1 | 12/2006 | Hill | |
| 2007/0125374 A1 | 6/2007 | Smith et al. | |
| 2007/0284474 A1* | 12/2007 | Olson | G05D 1/0022 244/10 |
| 2008/0089056 A1* | 4/2008 | Grosjean | B60Q 1/2673 362/103 |
| 2008/0192129 A1* | 8/2008 | Walker | G11B 27/034 348/231.2 |
| 2008/0218369 A1 | 9/2008 | Krans et al. | |
| 2010/0050485 A1* | 3/2010 | Forte | G09F 21/02 40/1.5 |
| 2010/0113106 A1* | 5/2010 | Supran | G06F 1/1632 455/573 |
| 2010/0210237 A1* | 8/2010 | Tomer | H04M 11/04 455/404.2 |
| 2010/0248682 A1* | 9/2010 | Prozeniuk | H04M 1/72536 455/404.2 |
| 2010/0253501 A1* | 10/2010 | Gibson | A41D 13/01 340/475 |
| 2011/0115460 A1* | 5/2011 | Elliott | H01H 50/02 323/285 |
| 2011/0292667 A1* | 12/2011 | Meyers | B60Q 1/38 362/465 |
| 2012/0053889 A1 | 3/2012 | Sambongi | |
| 2012/0060089 A1* | 3/2012 | Heo | G06F 1/1647 715/702 |
| 2012/0163269 A1* | 6/2012 | Shuster | H04W 4/206 370/312 |
| 2012/0184367 A1* | 7/2012 | Parrott | G06F 1/163 463/31 |
| 2012/0190384 A1 | 7/2012 | Marr et al. | |
| 2012/0310465 A1* | 12/2012 | Boatright | B60Q 1/346 701/25 |
| 2013/0093796 A1* | 4/2013 | Lee | G09G 3/003 345/690 |
| 2013/0095726 A1* | 4/2013 | Sofman | A63H 17/40 446/397 |
| 2013/0104896 A1 | 5/2013 | Kimm et al. | |
| 2013/0317667 A1* | 11/2013 | Kruglick | B64C 39/024 701/2 |
| 2014/0145845 A1* | 5/2014 | Sattari | G08B 21/24 340/539.13 |
| 2014/0232570 A1* | 8/2014 | Skinder | G01C 21/165 340/989 |
| 2014/0280580 A1* | 9/2014 | Langlois | H04W 4/005 709/204 |
| 2014/0362704 A1* | 12/2014 | Jha | H04W 36/22 370/237 |
| 2015/0172894 A1* | 6/2015 | Gabel | H04W 4/22 455/404.2 |
| 2015/0185045 A1 | 7/2015 | Crawford et al. | |

* cited by examiner

SYSTEM AND METHOD FOR PROVIDING MOBILE PERSONAL SECURITY PLATFORM

CROSS-REFERENCE TO RELATED APPLICATIONS

This application is a Continuation-In-Part of U.S. patent application Ser. No. 15/113,831 which was filed on Jul. 24, 2016 and which, in turn, is a U.S. National Phase application under 35 U.S.C. 371 of International Application No. PCT/IB2015/050567, which has an international filing date of Jan. 26, 2015, and which claims priority and benefit from U.S. Provisional Patent Application No. 61/965,255, filed Jan. 27, 2014 and U.S. Provisional Patent Application No. 62/075,914, filed Nov. 6, 2014. This application further claims priority and benefit from U.S. Provisional Patent Application No. 62/273,480, filed Dec. 31, 2015. The contents and disclosures of the above-identified applications are incorporated herein by reference in their entirety.

FIELD OF THE INVENTION

The present disclosure relates to a personal security platform. In particular, the present disclosure relates to such systems designed to be worn or attached to one's garment during use to provide safety and security measures and help if facing hostility, aggression, harassment, or being in any other emergency situation mostly while in an outdoor activity such as biking, jogging, walking, usage of any open vehicle and the like.

BACKGROUND OF THE INVENTION

A personal safety/security threat is a situation in which a person is at risk of personal harm, which may be in the form of harassment, an assault, sexual assault, assault causing bodily harm, threat of assault, uttering threats of death/damage, of an individual, or any other act that constitutes a violent act. Personal safety and security becomes more significant with the pace and dynamicity of modern life and commonly, people avoid a personal safety/security threat as a natural behavior. Furthermore, keeping people safe is becoming more challenging than ever, not only because of the risky and dangerous times we're living in, but also due to the ease of sharing information, accurate and inaccurate, through smartphones, computers, various social networks. The constant connection to social media, news outlets and the like becomes a double-edged sword; it may be a powerful tool to alert people about threatening conditions, but it may also be an easy way to spread misinformation, set off chaos, and cause people to react in ways that put them at greater risk of harm. Thus, the importance of technology in our lives, security encompasses much more than it used to and may have high influence on outdoor activities.

Accordingly, outdoor personal security may employ advance technology to provide higher level of personal security, especially with emerging technologies such as drones and the like.

The need is to provide personal security for live events associated with a person that may go for jogging, walking in the neighborhood, a child on way to school and the like. The invention described herein addresses the above-described needs.

SUMMARY OF THE INVENTION

According to one aspect of the presently disclosed subject matter, there is provided a personal security platform for providing automatic security measures, the personal security platform comprising: a wearable item comprising a microprocessor, a command signal generating unit and a communication interface. The micro-processor configured to execute a software application module, the command signal generating unit configured to generate at least one command signal communicating via the communication interface for controlling at least one protecting agent, the communication interface further operable to provide a communication channel to a remote device, a location tracker module for tracking a location, said tracker module configured to provide location based data, and wherein at least one personal protecting agent comprises an unmanned aerial vehicle (UAV), and the software application module is configured to communicate with at least the unmanned aerial vehicle (UAV) such that the software application module controls said UAV.

In some embodiments, the wearable item of the personal security platform may comprise the location tracker module. The location tracker module may comprise a satellite navigation system.

Optionally, the location tracker module is configured to communicate with an external satellite navigation system.

As appropriate, the wearable item is configured to retrieve map data from an external source, based on data from said location tracking module.

Variously, at least one said protecting agent is selected from one or more of: a rear-facing display, front-facing display, at least one motion sensor and at least image capturing device.

As appropriate, the rear-facing display is visible to an observer behind the user and wherein the front-facing display is visible to an observer before the user when wearing the wearable item, the rear-facing display and the front-facing display, each comprising one or more indicators.

As appropriate, the rear-facing display is operable to receive the at least one command signal thereby controlling each of the indicators according to the at least one command signal.

As appropriate, at least one motion sensor is configured to determine at least one motion parameter associated with the user. Variously, the at least one motion sensor is selected from a group consisting of: an accelerometer, a tilt sensor, a proximity sensor and combinations thereof.

As appropriate, the at least one image capturing device comprises at least one camera.

Variously, the at least one camera is selected from a group of cameras consisting of a front camera, a back camera, a side camera and combinations thereof, and accordingly, the at least one image capturing device is operable to receive the at least one command signal thereby controlling the operation of the at least one image capturing device and provide at least one captured image.

According to some embodiments, the personal security platform further comprises a user interface comprising one or more activation interfaces. The activation interface comprise a manual device operable to transmit one or more manual commands to the command signal generating unit to generate the at least one command signal such that the personal security platform is manually activated. Variously, the manual device is selected from a group consisting of: a push button, a button, a lever, a switch, a handle, a knob and a pull cord. Additionally or alternatively, the activation interface comprise a voice sensitive microphone operable to transmit one or more voice commands to the command signal generating unit to generate the at least one command signal such that the wearable signaling system is voice activated.

As appropriate, the software application module is configured to communicate with at least one the unmanned aerial vehicle (UAV) via the communication channel.

Furthermore, the personal security platform further comprises an emergency services module configured to control at least one emergency service.

Optionally, the at least one emergency service comprises activating emergency calls according to a pre-configured emergency call list.

Optionally, the emergency services module is operable to receive the at least one command signal thereby controlling the operation of said at least one emergency service.

Optionally, the at least one emergency service comprises activating at least one flashlight of at least one said unmanned aerial vehicle (UAV) via said communication channel.

Optionally, the at least one emergency service comprises activating at least one speaker of at least one the unmanned aerial vehicle (UAV) via the communication channel.

Variously, the emergency services module is operable to activate the at least one emergency service by one or more ways selected from a group consisting of: automatically, manually, vocally and combinations thereof.

According to yet another aspect of the disclosure a method is hereby taught for use in a personal security platform for providing automatic security measures for a user, the method comprising: providing a personal security platform having a wearable item comprising a micro-processor, a command signal generating unit and a communication interface and a location tracker module for tracking a location of the user, said platform operable to control at least one protecting agent; executing a software application by said micro-processor configured to communicate with said at least one protecting agent; monitoring at least one input parameter from at least one platform component; analyzing said at least one input parameter to determine at least one command action; generating at least one command signal to perform said at least one command action; and transmit said at least one command signal to said at least one protecting agent, such that said at least one command action is being executed.

Another aspect of the disclosure is to present a personal security platform for providing a signaling system operable to provide automatic signaling for a user of an open vehicle. The wearable signaling system comprising: a wearable item comprising a signal command generating unit, the signal command generating unit configured to generate at least one command signal for controlling at least one signaling agent; at least one motion sensor configured to determine at least one motion parameter associated with the open vehicle; a location tracker module for mapping and tracking a location, the tracker module configured to provide location based data; and an image capturing module comprising at least one camera operable to provide at least one captured image, wherein the at least one signaling agent comprises a rear-facing display visible for an observer behind the user when wearing the wearable item, the rear-facing display comprising one or more indicators, and wherein the rear-facing display is operable to receive the at least one command signal thereby controlling each of the indicators according to the at least one command signal.

The wearable item may comprise the location tracker module. Additionally, the location tracker module may comprise a satellite navigation system. Optionally, the location tracker module is configured to communicate with an external satellite navigation system.

According to some embodiments, the wearable item is configured to retrieve map data from an external source, based on data from the location tracking module.

As appropriate, in some embodiments the command signal generating unit is operable to determine said at least one command signal by analyzing one or more of the location based data, the at least one motion parameter and the captured image to provide at least one analysis result.

Variously, the at least one motion sensor is selected from a group consisting of: an accelerometer, a tilt sensor, a proximity sensor and combinations thereof.

Variously, the at least one camera is selected from a group of cameras consisting of a front camera, a back camera, a side camera and combinations thereof.

As appropriate, the at least one capturing device is operable to receive said at least one command signal thereby controlling the operation of said at least one capturing device and provide at least one captured image.

In some embodiments, the personal security platform further comprises a user interface comprising one or more activation interfaces. As appropriate, the activation interfaces comprises a manual device operable to transmit one or more manual commands to the command signal generating unit to generate the at least one command signal such that the wearable signaling system is manually activated.

Variously, the manual device is selected from a group consisting of: a push button, a lever, a switch, a handle, a knob and a bar In some embodiments, the personal security platform, the activation interfaces comprises a voice sensitive microphone enabling to transmit one or more voice commands to the command signal generating unit to generate the at least one command signal such that the wearable signaling system is voice activated.

Optionally, the indicators comprises light-emitting diodes (LED). Variously, the indicators are selected from a group consisting of: turning lights, brake lights, running lights, hazard lights and combinations thereof.

Accordingly, the indicators are characterized by one or more of the following:

(a) the brake lights are automatically activated when the command signals indicate slowdown of the open vehicle;

(b) the turning lights are automatically activated such that the direction of turning is presented when the command signals indicate a direction change at a rate higher than a pre-configured turning threshold;

(c) the running lights are automatically activated upon system startup;

(d) the hazard lights are automatically activated when reaching a recorded dangerous intersection or road to ensure visibility; and (e) the hazard lights are automatically activated when the command signals indicate the observer is closer than a pre-configured distance threshold.

Variously, the at least one camera is selected from a group of cameras consisting of at least one front camera, at least one back camera, at least one side camera and combinations thereof. As appropriate, the at least one camera is automatically activated when reaching a recorded dangerous intersection to ensure safety.

In some embodiments, the image capturing module is characterized to performing one or more of the following:

(a) activating the at least one camera according to a pre-configured setting;

(b) receiving the at least one command signal thereby controlling the operation of the at least one capturing device; and (c) providing at least one captured image.

In some embodiments, the personal security platform further comprises a communication module operable to communicate with a remote server.

In some embodiments, the personal security platform further comprises an emergency services module configured to control at least one emergency service. Accordingly, the at least one emergency service comprises activating emergency calls according to a pre-configured emergency call list. Furthermore, the emergency services module is operable to receive the at least one command signal thereby controlling the operation of the at least one emergency service.

Variously, the communication module comprises a mobile network transceiver selected from the groups consisting of: a 2G transceiver, a 3G transceiver and the 4G transceiver.

Variously, the communication module comprises a WLAN transceiver selected from the group consisting of: a WiFi transceiver and a Zigbee transceiver.

In some embodiments, the personal security platform further comprises a social network module configured to provide social event communications via the communication module. As appropriate, the social network module configured to activate the at least one camera and share the at least one captured image with a community. Accordingly, the social network module configured to share at least one pre-configured message with the community.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DETAILED DESCRIPTION OF EMBODIMENTS

Figure 1A:
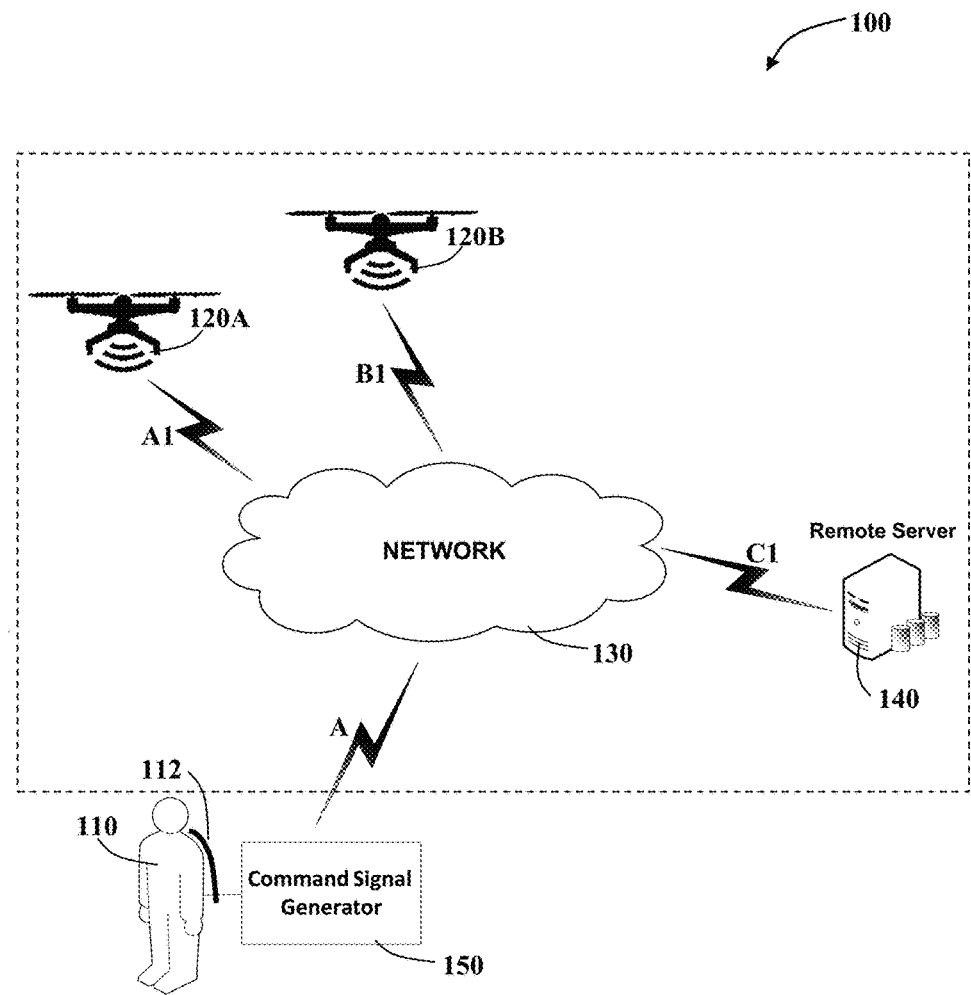
FIG. 1A illustrates a schematic view of a personal security platform operable to provide automatic security measures and communicate with an associated protecting agent according to the presently disclosed subject matter.

One aspect of the present disclosure relates to systems and methods for a personal security platform providing automatic security measures for a user by using a wearable item comprising a micro-processor, a command signal generating unit and a communication interface, where the platform is operable to control at least one protecting agent such as a an unmanned aerial vehicle (UAV). The platform may be operable to use a location tracker module for tracking a location and providing location based data. Additionally, the micro-processor may be operable to execute instructions of a software application module operable to communicate with at least one UAV such that the software application module controls said UAV.

Another aspect of the disclosure relates to systems and methods for a personal security platform providing a signaling system operable to provide automatic signaling for a user of an open vehicle by using a wearable item comprising a command signal generating unit configured to generate at least one command signal for controlling at least one signaling agent such as a rear-facing display visible for an observer behind the user when wearing the wearable item. The rear-facing display may include one or more indicators and the rear-facing display is operable to receive at least one command signal thereby controlling each of the indicators according to command signal.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

Unmanned Aerial Vehicle (UAV, Drones):

The term 'drone', in a technological context, is used to refer to an unmanned aircraft. Drones are more formally known as unmanned aerial vehicles (UAVs) or unmanned aircraft systems (UASes). Essentially, a drone is a flying robot. The aircrafts may be remotely controlled or can fly autonomously through software-controlled flight plans in their embedded systems working in conjunction with onboard sensors and satellite navigation systems.

In the recent past, UAVs were most often associated with the military, where they were used initially for anti-aircraft target practice, intelligence gathering and then, more controversially, as weapons platforms. Drones are now also used in a wide range of civilian roles ranging from search and rescue, surveillance, traffic monitoring, weather monitoring and firefighting. Currently, personal drones become more common and so are business drone-based photography, as well as videography, agriculture and even delivery services.

A personal drone, besides the simple entertainment factor of remote-controlled vehicles, personal drones have in the past most often been used for still and video photography.

Drones are used in situations where manned flight is considered too risky or difficult and may serve as "eye in the sky" for security purposes.

DESCRIPTION OF THE EMBODIMENTS

Reference is now made to FIG. 1A, there is provided a schematic view of a personal security platform, which is generally indicated at 100, the platform is operable to provide automatic security measures and help if facing hostility, aggression, harassment, or any other emergency situation, mostly while in an outdoor activity such as biking, jogging, walking, usage of any open vehicle and the like. The platform 100 comprises a wearable item 112 worn by a user 110 comprising a micro-processor (not shown) and a command signal generating unit 150 configured to generate at least one command signal communicated via the communication network 130 using the communication interface of channel "A" for controlling at least one protecting agent such as exemplified by the drones 120A (via channel "A1") and drone 120B (via channel "B1"). The command signal generating unit 150 is further operable to communicate command signals to a remote server 140 via the communication network 130 and via channel "C1", comprising relevant data messages.

It is noted that the wearable item 112 may be a device, a token and the like attached to the user garment.

It is also noted that the personal security platform 100 is configured to be activated automatically upon identifying an alerting condition, or manually by pressing a button or by pulling a cord, for example, or may be voice activated.

It is specifically noted that in addition, the personal security platform is operable to provide various technical features, as described hereinafter. The platform, using wearable technology, may include controllable high visibility displays (rear-facing, back-facing for example), various image capturing devices operable to record the journey/ride/walk, tracking the route using location tracking devices such as satellite navigation systems, provide social connectivity to share and communicate with friends and other riders, for example, emergency monitoring services to support any unexpected conditions and provide help services.

Additionally, the personal security platform 100 is operable to communicate a signal message to the drone (120A, 120B) to trigger a sound broadcasting function in the drone so that, in case of emergency, the drone can activate a voice from loudspeakers to scare off threats.

It is noted that, accordingly, the wearable technology application may be provided with high visibility turn signals, cameras to record a journey as well as connectivity to track a route, friends and biometrics. Selected features of the system may include: LED Turn Signals and Brake Lights; satellite navigation, location tracking and mapping to assist navigation and to track other riders; social connectivity to allow connecting with friends and other riders; image capturing devices to record a jouney (photos and videos); and further, when necessary provide emergency monitoring service.

The platform, as such may include: various type of image capturing devices and cameras (front, back, side), microphone and call buttons, LED turning signals, brake lights, reflective material, location tracker and navigation system, social and emergency connectivity via an associated software application running on a mobile communication device.

Accordingly, the smart LED indicator may include: High Visibility turn signals; brake lights and running lights; motion control sensors; auto-activated brake lights; satellite navigational mapping may automatically activate turn signals which may provide various safety and security measures of high visibility and safety; hands free activation possibly via voice activated controls using an integrated microphone; broadcast current location; and emergency mode may be triggered by a motion controlled accident sensor, for example, and may automatically engage hazard lights, camera, emergency calls.

Additionally, the integration of a front and back cameras may allow features including: recording the road, monitoring around, hands free activation, high quality image recording and well positioned point of view.

Furthermore, an emergency alert feature may be triggered by a push button or sensor input for example indicating sudden stop/falling.

An automatic notification interface may be provided for communication with autonomous vehicles. It is noted that such an interface may make the user visible to self-driving automobiles and the like.

A live video feed function may be triggered in the drone by key events (optionally, based upon signal commands received from the user) such as an impact, a fall or an attack. Accordingly, the drone can send a live video feed to a desired address, possibly to a particular telephone number or e mail address.

The currently disclosed personal security platform may provide a list of benefits, such as capturing adventures; sharing with friends online; storing captured images in the cloud; documenting emergency and dangerous situations, including attacks, harassments and the like; using a motion controlled accident sensor to automatically engages hazard lights; using cameras and emergency calls.

It is a particular feature of embodiments that a voice sensitive microphone may be incorporated into the wearable system. The features of the microphone may include: voice activated and on/off call button; hands free activation; Bluetooth connectivity with smartphones.

Furthermore, executing an appropriate software application may provide additional benefits including: calling for emergency help activated by voice' including provide full functionality activation by voice; communicating with friends and narrating the journey.

The system may feature satellite navigation, mapping and tracking, providing various benefits including: people tracking allowing one to keep their children safe, knowing always their location; providing self-tracking knowledge (know where you are and where you are going to); finding best routes and point of interest; finding ride/jogging times and distances; tracking friend in real time; and archiving routes, speed and distance data.

Accordingly particular benefits supported by the personal security platform include: satellite navigation mapping via smartphone application; hands free voice activation; saving favorite destinations and routes; tracking other riders; and tracking of children by their parents.

Additionally, social connectivity features of the platform may include: real-time social connectivity; hands free activation; voice navigation; and tapping into the social community.

It will be appreciated that these features provide still further benefits such as: connecting with friends online all along during a journey; sharing of rides with photos, video, voice recordings, tipping of great rides and destinations; and connecting directly to social network such as Facebook and favorites social media applications.

The platform may also offer twenty-four hour emergency monitoring service features, including: emergency call services; tracking services of the ride; motion control sensor auto-activated in an emergency mode to engage automatically hazard lights, brakes, cameras and emergency calls and alarms; providing pre-programmed emergency call dials such as 911 and the like.

The Associated software application may provide still further features, including: simple, smart, intuitive hands free activation of all features; supporting of watches of Apple iOS, Android and other smart watches; Bluetooth connectivity; free download for all updates; providing premium features with subscription; enabling GPS mapping, tracking and social connectivity; health reporting with tracking and archiving; providing routes, speeds and distances; saving and sharing of favorite routes; providing photos, videos, tipping of destinations; social connectivity and community.

It is noted that a children notification feature may be supported for example while a student is with a school bus. The driver may receive indications that a passenger (a student) is waiting at a specific bus stop.

Additionally, the monitoring option may be configurable by a parent/supervisor to a specific set of parameters. If the child/user using the software application, the parent or the supervisor may configure the parameters such that if changed or if the child strays outside this set of parameters, a notification will be transmitted to increase safety and security.

Furthermore, if the child/user inputs into the software application a destination setting, the Parent/Supervisor may be notified of the chosen destination It is noted that in some embodiments a variety of further functions and systems may be enabled, including: a "Visible Me" function may allow the following:

A third party location tracking agents may connect with the software application so they will be able to notify a driver that a rider is approaching or near.

At the same time the biker may get a notification that a car is approaching

These features may be activated while a car is going above a certain threshold speed, say 20 MPH or more. The speed feature may be disabled in specific area such as city center, where bike riders are assumed to be close to city traffic, thus alerting and notifications are also disabled.

When a driver is signaling with his indicator, right or left, and a biker is behind, the software application in conjunction with the location tracking agent of the car, may notify the car that a biker is behind.

It is further noted that a microprocessor may be incorporated into the wearable item and will process all relevant data and communication, the microphone on the wearable item and the earpiece will continue to communicate if the officer loses his phone or walkie-talkie for example, a police officer, firefighter, correction officer and other security guards, if they were to fall or some unnatural movement, (such as falling from a bike) which will be sensed and notification will be sent to the pre-programmed number or the back office or headquarters of the monitoring station.

While wearing the wearable item, with the microprocessor, if a police officer un-clips his gun from the holster, it will immediately notify the back office or headquarters of the monitoring station.

The back office will be able to remotely turn on the wearable item camera and/or the microphone and other communications on the wearable item.

Moreover, the platform may be configured such that there is an emergency button on the wearable item itself that can be pushed to call for help.

Additionally, one should appreciate that:

(A) In known historically dangerous intersections and roads, the LED lights, will automatically light up to ensure visibility.

(B) In known historically dangerous intersections and roads, the camera will automatically turn on for safety purposes.

(C) A drone will be able to follow the user automatically, possibly via the app (D) The app will be configurable to automatically notify a school bus driver, of a child's bus stop, that the child was picked up at the stop and dropped off at the school. This can be via the software application, if a child does not have a smartphone, there will be a separate device with the vest.

Figure 1B:
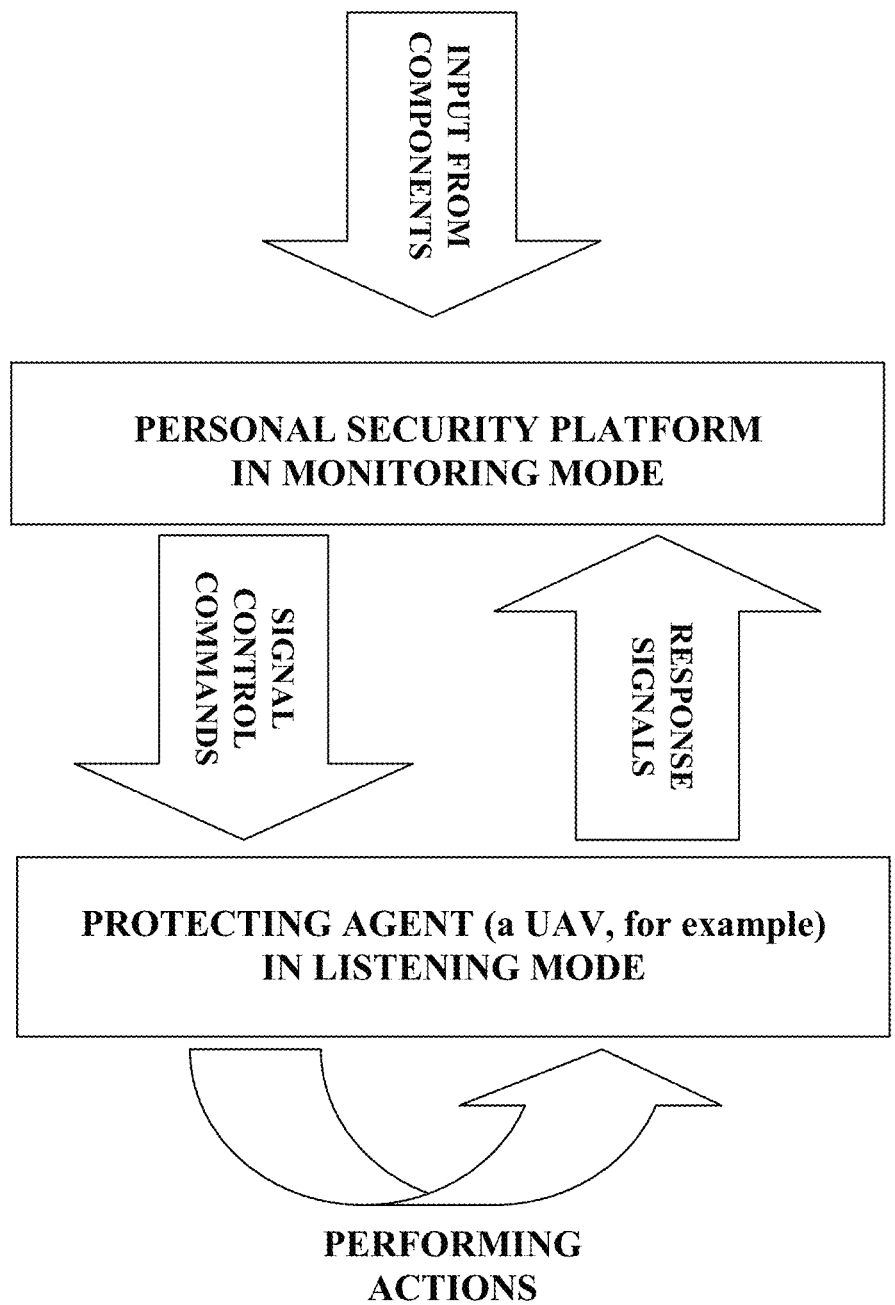
FIG. 1B is a flowchart representing command signal flow between a personal security platform and an associated protecting agent.
Figure 2:
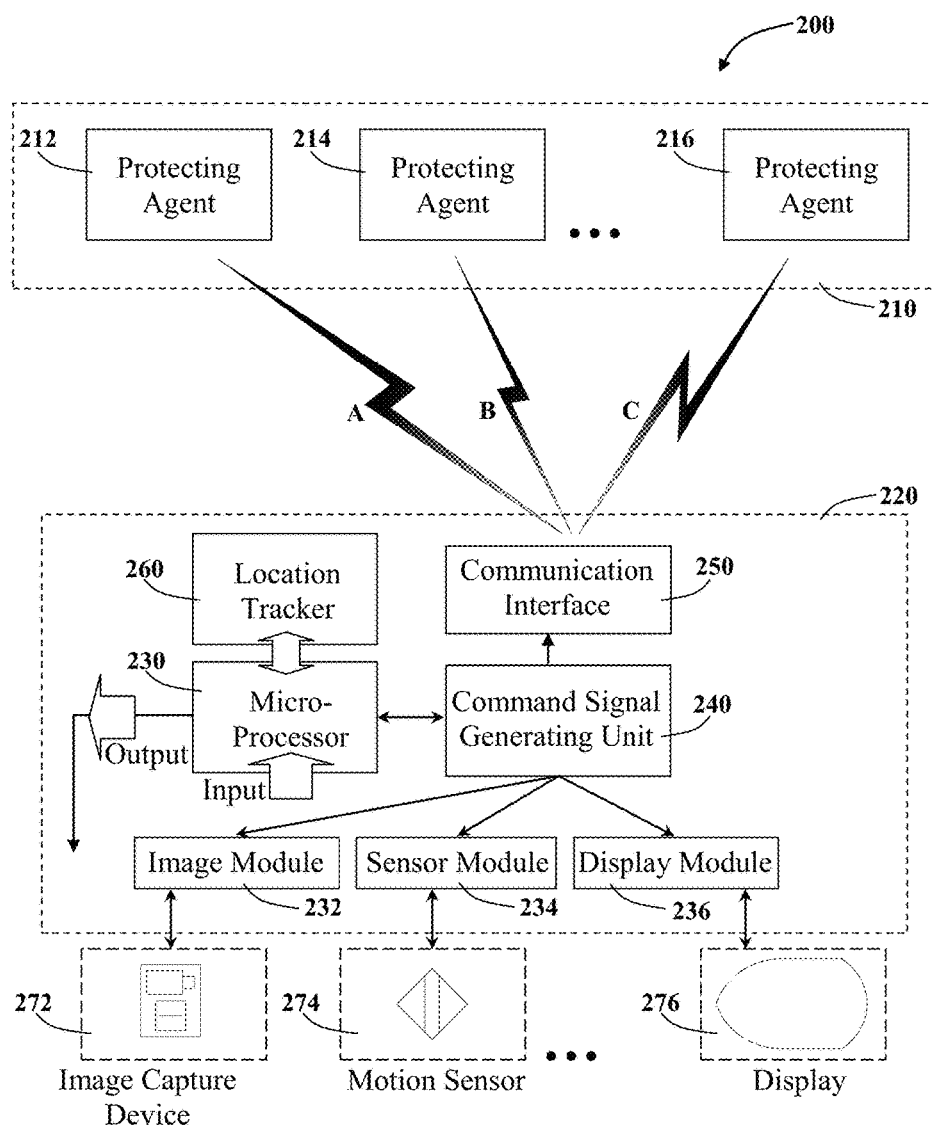
FIG. 2 illustrates a possible system architecture of the personal security platform presenting the various system components and modules of the personal security platform.

Reference is now made to the flowchart of FIG. 1B, the personal security platform 100 as described in FIG. 1A, may be operable in a monitoring mode reading input from the environment automatically via the various platform component such as location tracker module, motion sensors image capturing device and the like (FIG. 2). The platform may be in communication with various protecting agents such as 120A, 120B of FIG. 1A which may be configured to be in a listening mode, waiting for an activation signal from the personal security platform either for a continuous tracking of the user or activation of a specific action.

If a signal command is received such an activation signal or location update, the protecting agent is configured to respond accordingly and further may provide a response signal of confirmation.

When in monitoring mode, the personal security platform 100 may be configured to periodically transfer location command signals to allow for tracking of the user by the UAV, for example.

As detailed below, various command signals may be used with the platform. The command signals may be generated by a signal command generating unit (see FIG. 2) of the platform in response to automatic analysis of the monitored input or in response to actual commands of the user initiated manually (pressing a button, for example) or by voice commands.

Reference is now made to FIG. 2, there is provided a system architecture of the personal security platform, which is generally indicated at 200, the architecture presents the various system components of the personal security platform. The system architecture 200 comprises a wearable item 210 (FIG. 1A, indicated as item 112) operable to control at least one protecting agent such as a first protecting agent 212, a second protecting agent 214 and a third protecting agent 216.

It is noted that the protecting agents 212, 214 and 216 are presented as an example only and is intended to specify one or more protecting agents.

The wearable item 210 is configured to be worn by the user (FIG. 1A, item 110) or attached to his garment, and comprises a micro-processor 230, a command signal generating unit 240 and a communication interface 250.

The micro-processor 230 is configured to execute a software application module comprising a set of component modules such as an image module 232 configured to manage a protecting agent of an image capturing device 272, a sensor module 234 configured to manage a protecting agent of at least one motion sensor 274, a display module 236 configured to manage a protecting agent of at least one display.

The protecting agent of the display 276 may include a rear-facing display attached to the back of the user (FIG. 1A, item 110) or a front-facing display attached to the user (FIG. 1A, item 110) at the front or both.

The protecting agent of the motion sensor 274 is configured to determine at least one motion parameter associated with the user (FIG. 1A, item 110) and may be one or more of an accelerometer, a tilt sensor and a proximity sensor.

The protecting agent of the image capturing device 272 may include at least one camera that may be selected from a group of cameras consisting of a front camera, a back camera, a side camera and combinations thereof.

The command signal generating unit 240 is configured to generate at least one command signal to allow communicating via said communication interface for controlling at least one protecting agent such as a protecting agent 212, a protecting agent 214 and a protecting agent 216 (using communication channels "A", "B" and C" respectively).

It is noted that the communication interface 250 is further operable to enable communication with at least one remote server (see FIG. 1A, item 140).

The personal platform further comprises a location tracker module 260 for tracking a location of the user (FIG. 1A, item 110), and the location tracker module is configured to provide location based data.

Optionally, the wearable item 220 comprises the location tracker module 260. Additionally, the wearable item 220 is configured to retrieve map data from an external source, based on data from the location tracking module 260.

Optionally, the location tracker module 260 comprises a satellite navigation system. As appropriate, the location tracker module 260 is configured to communicate with an external satellite navigation system.

It is noted that a particular feature of the current disclosure is that at least one of the personal protecting agent (212, 214, 216) comprises an unmanned aerial vehicle (UAV), and that the software application module is configured to communicate with at least one of the unmanned aerial vehicle (UAV) such that the software application module controls the UAV.

It is noted that the protecting agent may further be selected from one or more of: a rear-facing display, front-facing display, at least one motion sensor and at least image capturing device.

Additionally, the emergency feature may be operable by voice or activated loudly via a speaker to announce, for example, "YOU HAVE BEEN RECORDED" so as to deter a threat. Optionally, the emergency feature may be initiated by a user activated push button or the like.

Figure 3:
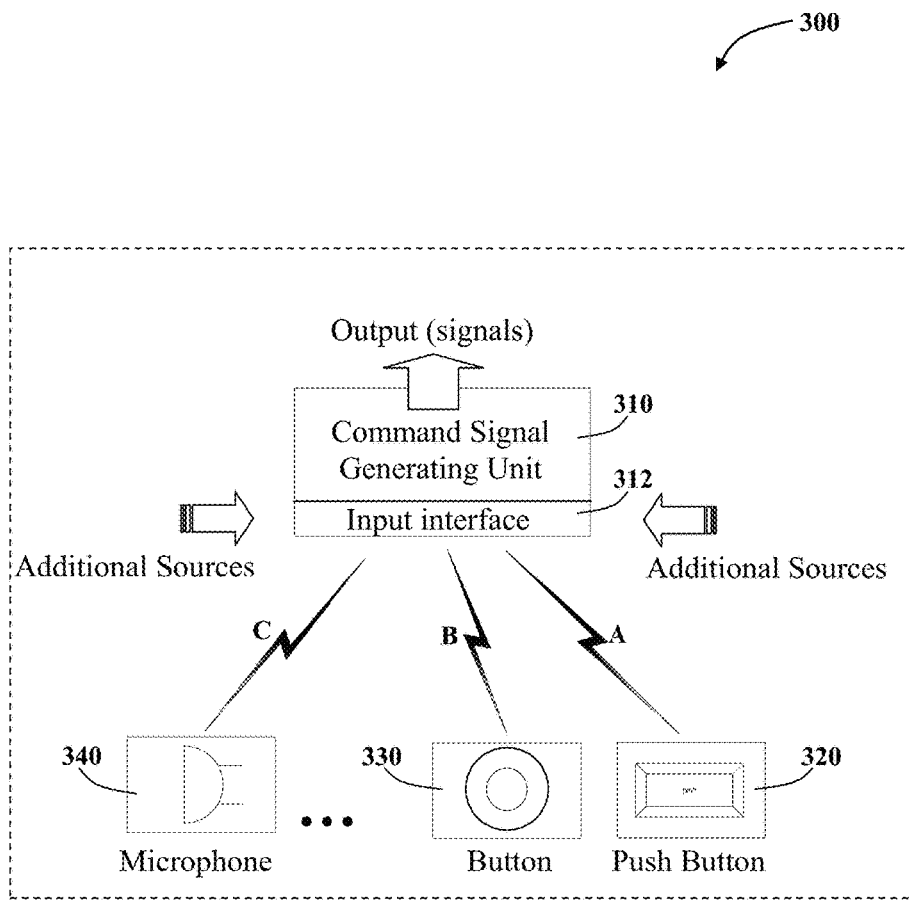
FIG. 3 illustrates the activation mechanism of the personal security platform configured to provide automatic, manual and voice activation methods.

Reference is now made to FIG. 3, there is provided an activation mechanism of the personal security platform, which is generally indicated at 300, the activation mechanism 300 configured to provide automatic activation methods, manual activation methods and voice activation. The activation mechanism 300 comprises a command signal generating unit 310 operable to receive input from various components via an input interface 312 and further generate appropriate output signal commands to operate the security platform accordingly.

The personal security platform is operable to receive input from various platform components and agents such as the Location Tracker (FIG. 2, item 260), image Capturing Devices (FIG. 2, item 272), Motions Sensors (FIG. 2, item 274), displays (FIG. 2, item 276) and the like in order to generate the necessary automatic commands. Additionally or alternatively, the personal security platform is further operable to drive various platform functions manually or read voice enabled commands to generate the desired signal commands. Thus, the command signal generating unit 310 is configured to read manual input from manual components such as a push button 320 (via input "A"), a button 330 (via input "B") or similar other manual components such as pull cords (not shown) and the like. The command signal generating unit 310 may be further configured to read vocal commands via a microphone 340 (via input "C") associated with the personal security platform and activate the platform as appropriate. Optionally, the voice activation of the security platform may include a pre-configured set of voice commands.

Figure 4:
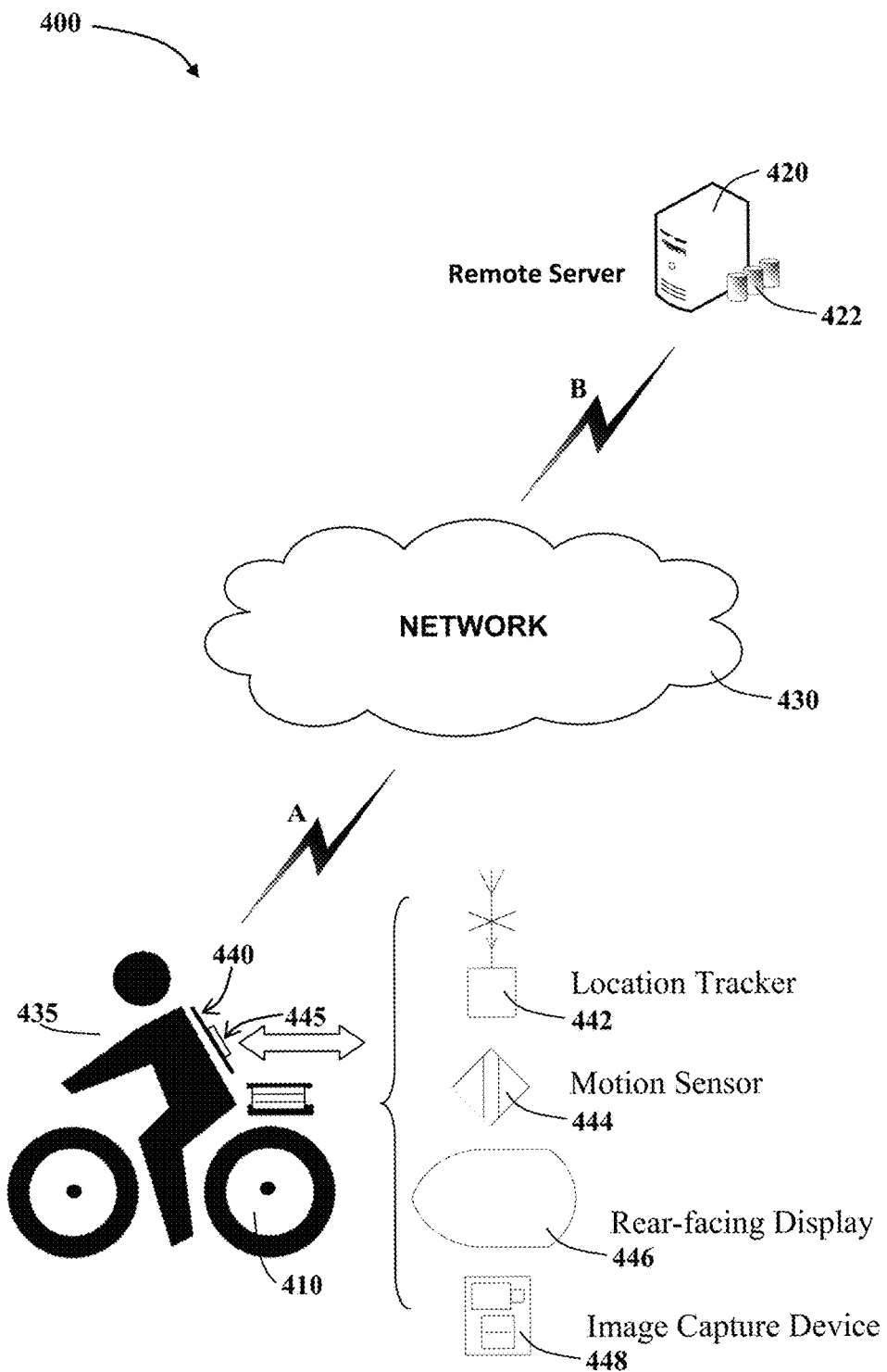
FIG. 4 illustrates another personal security platform designed for securing a rider of an open vehicle.

Reference is now made to FIG. 4, there is provided another personal security platform, which is generally indicated at 400, designed for securing a rider of an open vehicle. The personal security platform 400 comprises a wearable item 440 worn by a user 435 riding an open vehicle 410, the wearable item 440 comprising a command signal generating unit 445 operable to communicate with signaling agents and system components to provide automatic signaling and further to communicate with a remote server 420 through network 430 and communication channel "A".

The wearable item 440 further comprises a display module comprising a rear-facing display 446 visible for an observer behind the user 435 when wearing the wearable item 442, where the rear-facing display 446 comprising one or more indicators. The rear-facing display 446 is operable to receive at least one command signal from the command signal generating unit 445 thereby controlling each of the indicators (see FIG. 6A) according to signal commands.

Optionally, the display module comprises a front-facing display facing ahead towards the direction of motion and visible to observers ahead of the user 435.

The personal security platform 400 further comprises a location tracker module 442 for mapping and tracking a location, a motion sensor module 444 for providing at least one motion parameter associated with the open vehicle 410 and an image capturing module 448 comprising at least one camera operable to provide at least one captured image, wherein the camera may be one or more of a front camera, a back camera and a side camera.

Herein, the term "open vehicle" is used to denote a motorcycle, moped, motor scooter, manual or powered bicycle, or any other mode of transportation wherein a rider's upper body is exposed and readily visible to other travelers on the road.

Figure 5:
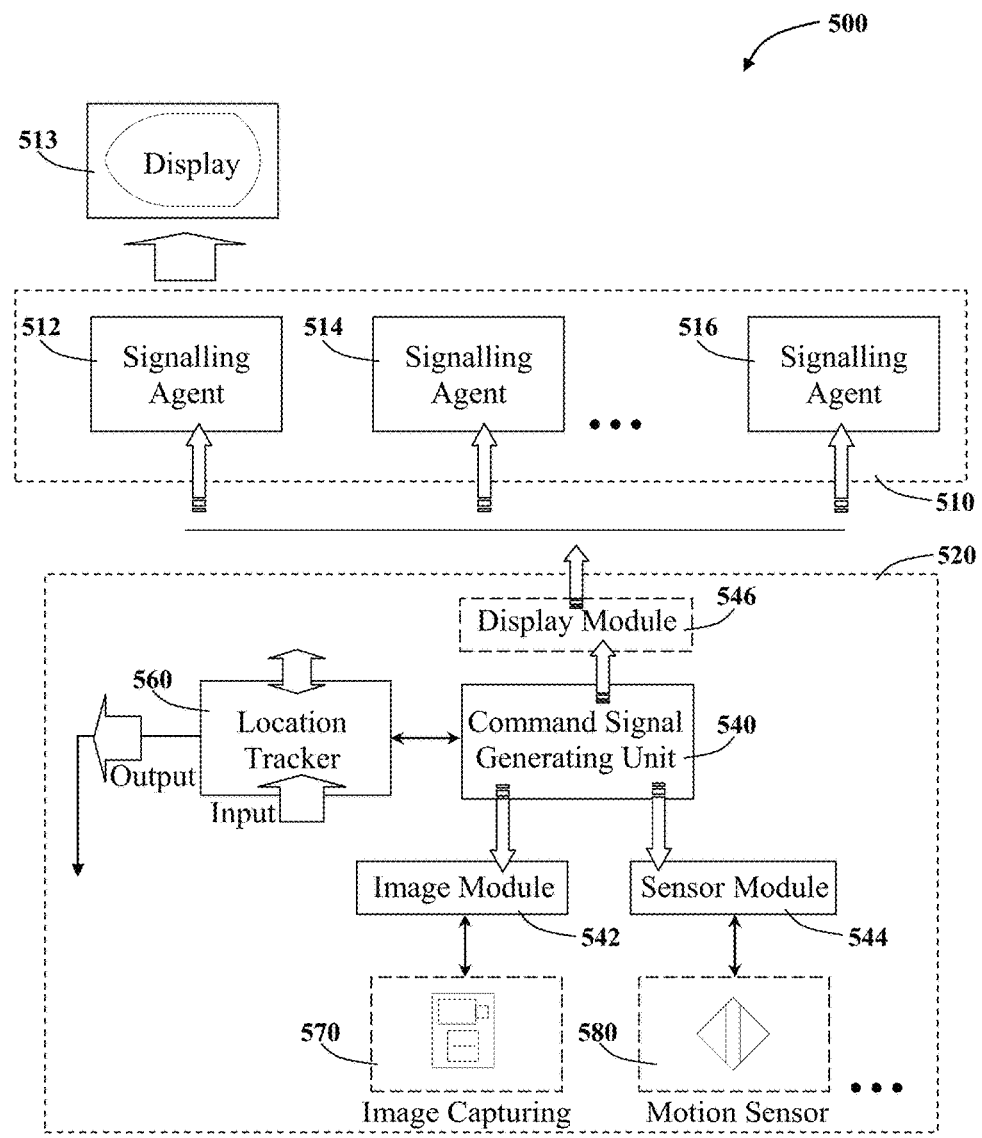
FIG. 5 illustrates another possible system architecture of the personal security platform presenting the various system components for providing automatic signaling for a user of an open vehicle.

Reference is now made to FIG. 5, there is provided another possible system architecture of the personal security platform, which is generally indicated at 500, the architecture presents the various system components of the personal security platform for providing a signaling system operable to provide automatic signaling for a user of an open vehicle.

The personal security platform architecture 500 comprises a wearable item 520 operable to control at least one set 510 of signaling agents such as a first signaling agent 512, a second signaling agent 514 and a third signaling agent 516 in communication with a display 513.

It is noted that the signaling agents 512, 514 and 516 are presented as an example only and is intended to specify one or more protecting agents.

The wearable item 520 is configured to be worn by the user (FIG. 4, item 440) or attached to his garment, and comprises a command signal generating unit 540. The command signal generating unit 540 is configured to generate at least one command signal for controlling at least one signaling agent and each of component modules associated with the platform, such as an image module 542 configured to manage an image capturing device 570, a sensor module 544 configured to manage at least one motion sensor 544, a display module 546 configured to manage a signaling agent of at least one display.

The display module 546 may control a signaling agent comprising a rear-facing display attached to the back of the user (FIG. 4, item 435) or a front-facing display attached to the user (FIG. 4, item 435) at the front or both.

The sensor module 544 is configured to determine at least one motion parameter associated with the user (FIG. 4, item 435) of the open vehicle (FIG. 4, item 410) and may be one or more of an accelerometer, a tilt sensor and a proximity sensor.

The image capturing module 542 is operable to control at least one camera that may be selected from a group of cameras consisting of a front camera, a back camera, a side camera and combinations thereof.

Accordingly, the command signal generating unit 540 is configured to generate at least one command signal to allow communication for controlling at least one signaling agent such as a signaling agent 512, a signaling agent 514 and a signaling agent.

The personal security platform architecture may further include a location tracker module 560 for tracking a location of the user (FIG. 1A, item 110), and the location tracker module 560 is configured to provide location based data.

Optionally, the wearable item 520 comprises the location tracker module 560. Additionally, the wearable item 520 is configured to retrieve map data from an external source, based on data from the location tracking module 560.

Optionally, the location tracker module 560 comprises a satellite navigation system. As appropriate, the location tracker module 560 is configured to communicate with an external satellite navigation system.

It is noted that a particular feature of the current disclosure is that at least one of the personal protecting agent (512, 514, 516) comprises an unmanned aerial vehicle (UAV), and that the software application module is configured to communicate with at least one of the unmanned aerial vehicle (UAV) such that the software application module controls the UAV.

Figure 6A:
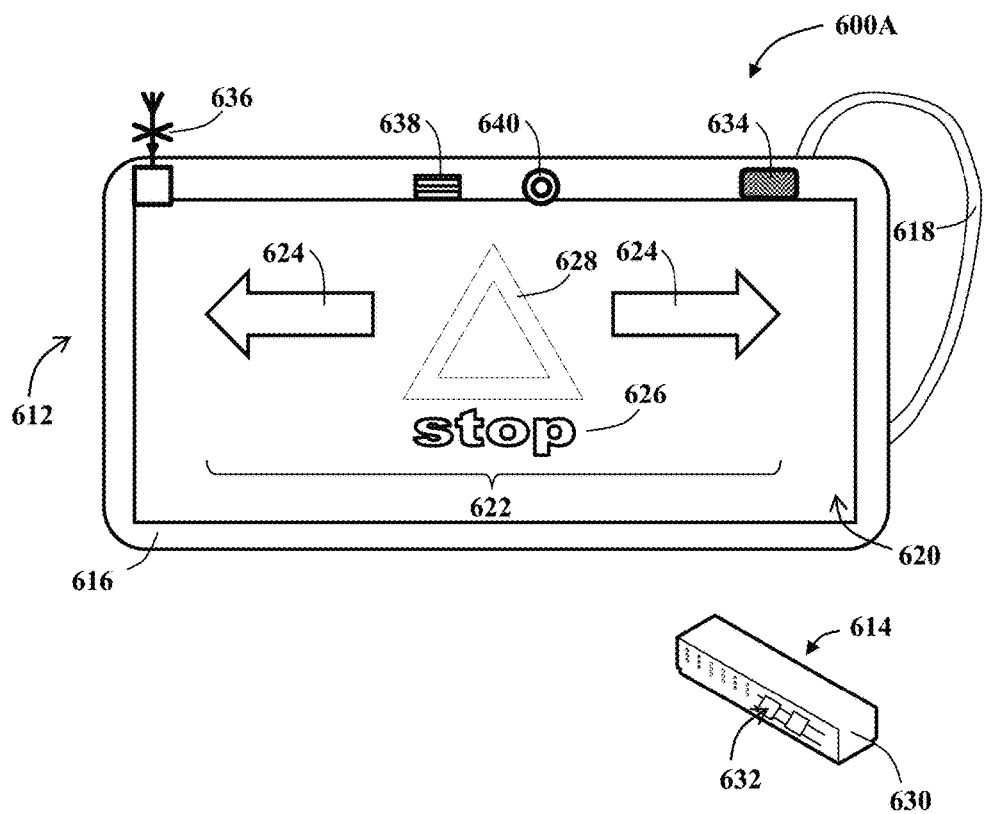
FIG. 6A illustrates a signaling mechanism of the personal security platform.

Reference is now made to FIG. 6A, there is provided a signaling mechanism of the personal security platform, which is generally indicated at 600A, designed for use by a rider of an open vehicle. Herein the specification and claims, the term "open vehicle" is used to denote a motorcycle, moped, motor scooter, manual or powered bicycle, or any other mode of transportation wherein a rider's upper body is exposed and readily visible to other travelers on the road. The system 600 comprises a wearable vest 612, a control interface 614, and a controller.

The vest 612 is configured to be worn by a user, and thus comprises a rear panel 616 and a carrying arrangement 618. The carrying arrangement 618 is configured to cooperate with the rear panel 616 to facilitate wearing the vest 612 such that when worn by a user, the rear panel 616 lays across the user's back, and is visible to an observer therebehind.

The carrying arrangement 618 may comprise a pair of straps, as illustrated. Alternatively, it may comprise any suitable arrangement to facilitate wearing the vest 612 as described above. According to one example, the carrying arrangement 18 may comprise a pair of front panels attached to bottom edges of the rear panel 616, giving rise to a pair of armholes. According to another example, the carrying arrangement 618 may comprise a single front panel attached to the rear panel 16 at two ends of a top edge thereof, giving rise to a neckhole, and being open at the sides.

The rear panel 616 comprises a rear-facing display 620 (i.e., disposed so as to be visible from an observer behind the user when wearing the vest 612), comprising one or more indicators, which are generally indicated at 622, thereon. The indicators 622 may be illuminative, for example comprising one or more light emitting diodes (LEDs). The controller is configured to operate the indicators 622 to produce signals signifying information about the user, in particular relating to parameters of the drive. According to some modifications, the display comprises a flexible screen, for example comprising organic light-emitting diodes (OLEDs), or any other suitable technology.

For example, one or more of the indicators 622 may be configured to signify that the user is about to or is in the middle of executing a right or left turn (i.e., constituting turn signals 624); one or more of the indicators 622 may be configured to signify that the user is in the middle of slowing down (i.e., constituting a brake light 626); one or more of the indicators 622 may be configured to signify a hazard such as a the vehicle being stopped in or near moving traffic, that the vehicle is disabled, that a vehicle is moving substantially slower than the flow of traffic, etc. (i.e., constituting a hazard warning light 628, which may be constantly illuminated or be flashing). It will be appreciated that the indicators 622 may be configured to display any other suitable message, mutatis mutandis.

Figure 6B:
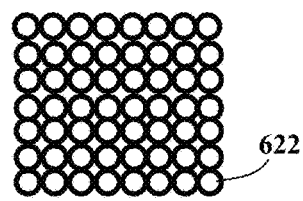
FIG. 6B illustrates a grid of indicators arrangement of the signaling mechanism as illustrated in FIG. 6A as a grid constituting pixels, with a controller being configured to selectively activate only those indicators required to produce the required signal.

According to some examples, as illustrated in FIG. 6B, the indicators 622 are arranged as a grid constituting pixels, with the controller being configured to selectively activate only those indicators required to produce the required signal. According to other examples, for example as illustrated in FIG. 6A, the indicators 622 comprise preformed signals, for example comprising LED strips, with the control being configured to selectively activate a required indicator to illuminate the required signal.

The control interface 614 is configured to facilitate the user to communicate with the vest 612, e.g., via the controller. It comprises a housing 630, which may contain the controller therein, and one or more user input devices 632. The user input devices 632 are configured to allow the user to indicate to the controller the type of signal to be displayed by the indicators 622 on the rear panel 616 of the vest. It may comprise, e.g., one or more switches, buttons, dials, etc., each of which (or positions of which) correspond to a different signal to be displayed by the indicators (e.g., turn signals, hazard warning lights, etc.).

According to some modifications, some or all of the user input devices 632 may be integrated into the vehicle, e.g., to be automatically activated during use of the vehicle. For example, for vehicles with integrated turn signals, user input devices 632 may be mounted to the vehicle such that when the user operates the vehicle turn signal, the user input device 632 is automatically operated. This may be accomplished mechanically (e.g., by positioning the user input device of the signaling system 600A such that movement of an element which operates the turn signal also operates the user input device), electrically (e.g., by wiring the user input device of the signaling system 600A to monitor an electrical signal which operates the turn signal of the vehicle, and to operate the indicators 622 accordingly), visually (i.e., by mounting cameras to monitor to turn signals of the vehicle, and operate the indicators 622 accordingly), or according to any other suitable method.

It will be appreciated that while the above example related to the turn signal of the vehicle, the user input device 632 may be similarly integrated to be automatically activated during use of the vehicle, mutatis mutandis. For example, a user input device may be situated so as to be activated by application of a brake pedal or grip, etc.

The control interface 614 is configured to communicate with the vest 612, e.g., the display 620 thereof, via any suitable method. According to some examples, they communicate wirelessly with each other, for example using one or more of a local area network, radio, Bluetooth, ZigBee, Near Field Communication, or any other suitable technology for facilitating wireless communication. A transmitter (not illustrated) may be integrated with the controller, and a receiver 634 provided on the vest 612 in communication with the display.

According to some modifications, the signaling system 600A does not comprises a dedicated control interface 614 and/or controller. Rather, the vest 612 (and elements thereof) is configured to communicate directly with a third-party device, such as a telephone (e.g., a mobile phone with advanced computing capabilities, herein "smartphone") or any other suitable electronic device (such as a pocket-sized computer, for example as marketed under the trade name "iPod®" by Apple Inc.). The device may be configured (e.g., by installing an application thereon) to receive user input (e.g., by visually sensing hand motions, by presenting a simulated control interface, etc.) and communicate a command to the vest 612 to operate the indicators 622 accordingly.

According to some examples, the device may be an optical head-mounted display.

According to the above, the device constitutes both the control interface 614 and controller of the signaling system 600A.

The vest 612 may comprise a location tracker module 636, configured to determine the current location of the vest (and thus the user) in real time by communicating with the satellite navigation system (such as the Global Positioning System (GPS) satellite network or the like). According to some examples, the module may be provided with local street maps, for example via map data being loaded into a memory module thereof. According to other examples, the vest 612 may communicate location information determined by the satellite navigation system to a device (such as a smartphone, pocket-sized computer, etc.) which provides relevant map data thereto, e.g., based on the determined location. The signaling system 600A may provide this information to a remote party, e.g., to track the user. This may be useful for facilitating a business to track a fleet of delivery vehicles, for enabling a parent or guardian to locate a child, etc. An alarm 638, which may produce one or more of an audio and a visual signal, may be activated if a user goes beyond a predefined area.

It will be appreciated that while the vest 612 is described above as comprising a satellite navigation system module 636, the satellite navigation system module may be part of a separate unit configured to communicate therewith, including, but not limited to, a smartphone, a head-mounted display, a dedicated satellite navigation system module, the controller, etc., without departing from the scope of the presently disclosed subject matter.

Location tracking data may be used to compare the speed of the vehicle to the speed of surrounding traffic, for example based on internet-based real time traffic information. If the controller determines, based on the location tracking data and traffic information received, that the vehicle is moving at a speed which is significantly lower than that of surrounding traffic (e.g., a predetermined percentage or net speed amount lower), it may automatically activate the indicators 622 to display a hazard warning light 28. Similarly, location tracking data may be used to automatically detect if the vehicle is slowing down, wherein the controller may activate the indicators 622 to display a brake light 626.

The signaling system 600A may comprise one or more motion sensors (e.g., an accelerometer, tilt sensor, etc., not illustrated) configured to determine parameters of the motion of the vehicle. These parameters may include, but are not limited to, turning, braking, driving speed, etc. The signaling system 600A may thus be configured to automatically activate the indicators 622 to display a suitable signal.

For example, if the motion sensors determine that the vehicle is turning, it may automatically activate the indicators 622 to display a turn signal 624. This function may be integrated with location tracking data. Based on the determined location of the vehicle and corresponding map data, the signaling system 600A may be configured to determine whether a detected vehicle turn is a turn which should be indicated (for example turning onto a side street) or is a turn which should not be indicated (for example following the topography of a curved road). The signaling system 600A may thus be configured to activate appropriate indicators 622 based on both determinations made by the motion sensors and location tracking data. For example, the indicators may display a turn signal 624 when a vehicle turn is detected by the motion sensors, and the location tracking data suggests that a turn should be indicated. The controller may employ one or more heuristic algorithms to make the determination.

By using data from both motion sensors and location sensors, the signaling system 600A may be configured to automatically display a signal faster and/or more accurately than it would be able to be based only on one thereof. In addition to the example provided above with respect to a turn signal, the determination of vehicle speed (i.e., to automatically activate the indicators 622 to display a brake light 626 and/or hazard warning light 28, as described above) may be supplemented with data from the motion sensors.

The controller maybe configured, based on one or more of location tracking data and data from the motion sensors, to determine if an emergency (such as a collision) has occurred. It may further be configured to send out one or more appropriate distress signals, such as communicating with emergency services, sending a message to one or more predetermined contacts (such as a parent, etc.). The signaling system 600A may be configured to interface with a mobile telephone for this purpose.

The vest 612 may further comprise one or more cameras 640 on the rear panel 616, disposed so as to image the area behind the user when wearing the vest. Image data may be recorded and/or communicated to a display unit mounted on the vehicle in front of the user. The display unit may be a dedicated device, or a suitably-configured (e.g., by installation of an application thereon) smartphone and/or pocket-sized computer. The signaling system 600A may thus be used to provide a rear-view to a user when operating his vehicle. This data may be selectively communicated to one or more predetermined contacts of the user.

The signaling system may be configured to automatically archive, either locally or on a remote server accessed wirelessly, visual data recorded by the cameras 640. This may be done automatically, or be event-driven (i.e., in case of an accident).

In addition, the camera 640 may be configured to be used to enable the system 600A to detect and alert vehicles behind the user if they are approaching too closely or too quickly.

According to one example, image data captured by the camera 640 may be used by the controller to determine relative speed of a vehicle approaching from behind the user. This may be accomplished, e.g., by analyzing the image data to detect objects, determining an object to be an approaching vehicle, and tracking the relative size of the object compared to the size of the same object captured in previous frames. Thus, the system 600A may determine if a vehicle approaching from behind is accelerating or maintaining its speed when it should be slowing down, etc.

According to another example, image data captured by the camera 640 may be used by the controller to determine the distance of a vehicle behind the user. This may be accomplished, e.g., by analyzing the image data and comparing it to objects of known sizes. For example, the controller may be preloaded with information related to the size of one or more features of vehicles, such as the size of license plates, the distance between outer edges of headlights (which may be, e.g., typical distances for most cars, distances for particular models of cars which may be determined based on recognizing the front of the car, etc.), or any other suitable value. The controller may thus be configured to determine the distance by comparing the apparent size of the feature captured by the camera to the known size thereof.

The system 600A may be further configured to be used as a social media device. For example, it may be configured to share images captured by the camera 640 on one or more social media networks. It will be appreciated that the "sharing on a social media network" as used herein the specification and claims includes, but is not limited to, posting on an online social media platform such that it can be accessed by anyone with access to the platform or by a predefined set of users, forwarding to a predefined set of contacts, for example via electronic mail, texting agent, Short Message Service (SMS) or Multimedia Message Service (MMS) message, or any other similar medium. Additionally or alternatively, the system may be configured to share the location of the system 600A on a social media network.

The location may be shared alone (e.g., as location tracking data, such as location tracking coordinates), or in conjunction with other information. The information may include, but is not limited to, a shared image, location information (e.g., a landmark, business, or other location in the vicinity of the shared location; it will be appreciated that the location may be shared with the location information, or the location information may be shared as the location), or any other suitable information.

The system 600A may be further configured to be used to report emergency information. For example, it may be configured to facilitate a user's inputting a report of an emergency and transmitting the emergency to the relevant emergency service (e.g., an emergency telephone number such as 911, 112, or 999, fire, police, or first aid services, an online emergency reporting service, etc.). It may further or alternatively be configured to automatically detect an emergency situation, for example by sensing disturbances to the vest (e.g., via the motion sensors), using image recognition of images captured via the camera 640, etc. The emergency information may include, but is not limited to, one or more of location, type of emergency, and images.

According to any one of the above examples, the controller may be configured, if it determines that a vehicle approaching from behind is too close or approaching too quickly, to activate one or more of the indicators 622 to display an appropriate warning to the vehicle.

The display may be further configured to display advertisement information. The information may be predetermined. According to some modifications, the controller may use GPS data to select and/or determine advertising information for display. For example, the signaling system 600A may be configured to display information relating to a business (e.g., a theater, restaurant, etc.) when the user is within a predetermined radius thereto. The signaling system may be further configured to display emergency information provided, e.g., by government agencies.

The platform, as described hereinabove (FIG. 1A, FIG. 6A) may be used to facilitate execution of one or more methods associated with required to safety and security measures for a user.

Figure 7A:
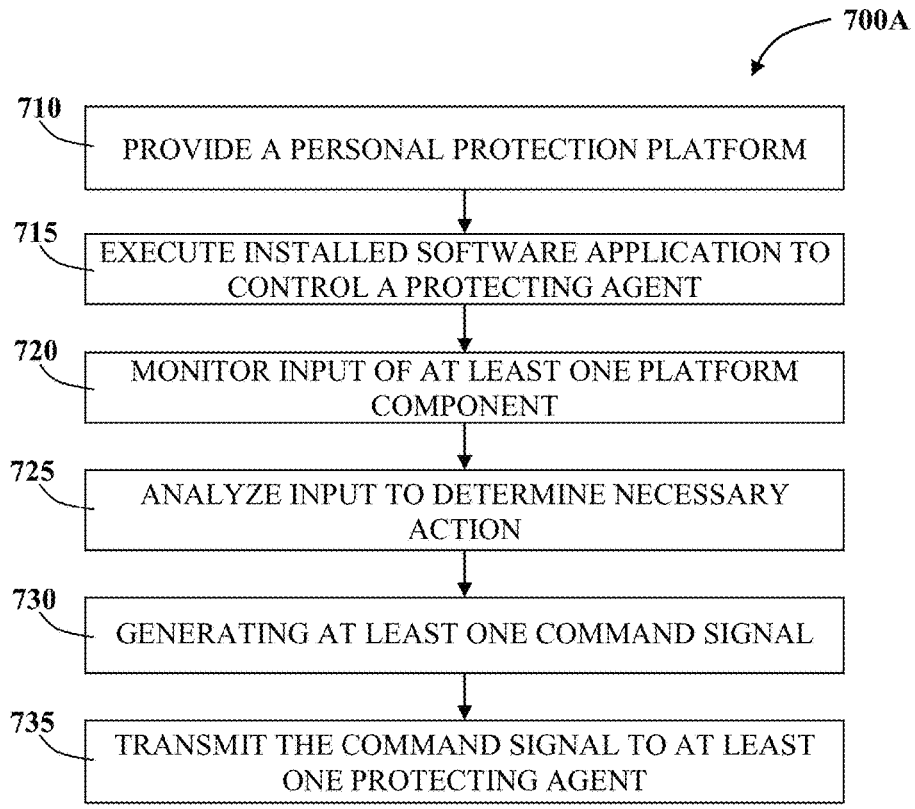
FIG. 7A illustrates a method used by the personal security platform to control at least one protecting agent such as a UAV as indicated in FIG. 1A.

As illustrated in FIG. 7A, a method 700A may be provided, whereby the personal security platform 700A is operable to control at least one protecting agent such as a UAV, as indicated in FIG. 1A.

In step 710 of the method 700A, a personal security platform for providing security measures to a user is provided, such as described hereinabove.

In step 715, the personal security platform 200 is configured execute the software application installed on the microprocessor 230 (FIG. 2) to provide the logic for controlling at least one protecting agent, thus providing the required safety and security measures to the user.

In step 720, the platform 200 monitors input received from the various platform components, relating to the current scenery thereof, from a location tracker module (FIG. 2, item 260), image module (FIG. 2, item 232) associated with captured images of at least one camera, sensor module (FIG. 2, item 234) associated with motion parameters. According to some examples, the location tracker module is integrated with the personal security platform 200. According to other examples, the location tracker module is external to the security platform 200 (such as a smartphone or a standalone location tracker module), and the platform is configured to communicate with it, inter alia to receive GPS data.

In step 725, the security platform 200 analyzes the input acquired as described in step 720 and determines the required action based on the location information provided by the location tracker, the sensor parameters and image and video data.

In step 730, the security platform 200 generates the necessary signal commands to trigger the required action. The signal commands may be generated by the signal command generating unit (FIG. 2, item 240). Alternatively, the signal commands may be generated by the microprocessor (FIG. 2, item 230).

In step 735, the security platform 200 transmits the generated signal command (as described in previous steps) to the at least one protecting agent (FIG. 2, items 212, 214, 216) or specifically to one UAV such as presented in FIG. 1A (items 120A, 120B) to execute desired control action.

Figure 7B:
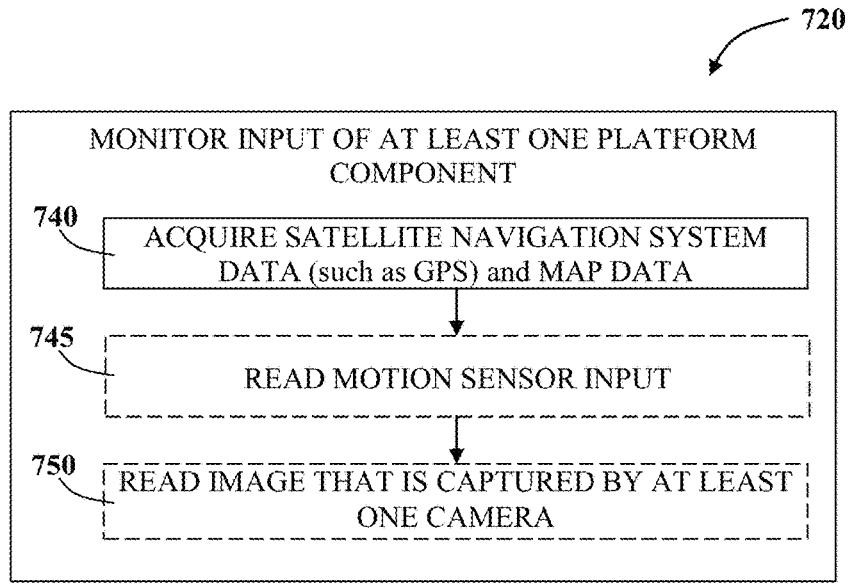
FIG. 7B illustrates a method whereby the personal security platform is operable to monitor input of at least one platform component as indicated in FIG. 1A.

As illustrated in FIG. 7B, a method 720 may be provided whereby the personal security platform 200 is operable to monitor input of at least one platform component, as indicated in FIG. 1. The platform 200 may monitor input relating to the current scenery thereof, from a location tracker module (FIG. 2, item 260), image module (FIG. 2, item 232) associated with captured images of at least one camera and sensor module (FIG. 2, item 234) associated with motion parameters.

In step 740 of the method 720, a personal security platform may acquire satellite navigation system data (such as GPS) and map data.

In step 745 of the method 720, the personal security platform 200 is operable to read input from at least one motion sensor; and In step 750 of method 720, the personal security platform 200 is operable to read at least one captured image from at least one camera.

Figure 8:
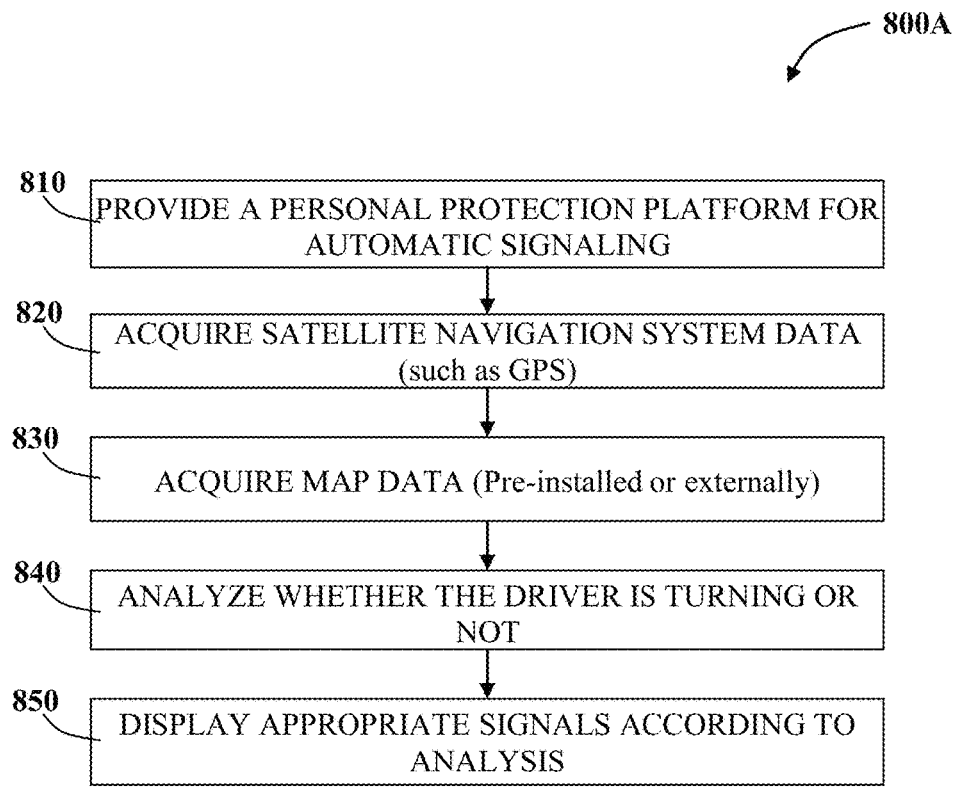
FIG. 8 illustrates a method used in the personal security platform for indicating a turn signal.

As illustrated in FIG. 8, a method 800A may be provided, whereby the platform 600A indicates a turn signal on its display 620.

In step 810 of the method 800A, a personal security platform for automatic signaling 600A is provided, such as described above with reference to FIGS. 6A and 6B. In particular, the platform 600A may be configured to acquire satellite navigation system and location data, and may comprise a display 620 with indicators 622, a controller, and one or more motion sensors, such as one or more accelerometers, one or more tilt sensors, etc.

In step 820, the platform 600A acquires data, relating to the current location thereof, from a location tracker module. According to some examples, the location tracker module is integrated with the platform 600A. According to other examples, the location tracker module is external to the platform 600A (such as a smartphone or a standalone location tracker module), and the platform is configured to communicate with it, inter alia to receive GPS data.

In step 830, the platform 600A acquires map data corresponding to the GPS data acquired in step 820. According to some examples, the platform 600A is preloaded with the map data. According to other examples, the system is configured to acquire the map data from an external source (such as a smartphone or by connecting directly to an information server, e.g., via the internet), e.g., on demand based on the GPS data.

In step 840, the platform 600A determines, based on information provided by the motion sensors thereof, whether or not the vehicle being driven by the user is turning.

As In step 850, the controller determines, based on the location information provided by the location tracker, the map data, and the information provided by the motion sensors, whether or not a turn signal should be displayed. For example, if the motion sensors indicate a turn, but the GPS and map data indicate that the user is following the topography of the road, the controller may determine that no turn signal should be displayed. If the motion sensors indicate no turn, but the GPS and map data indicate that the user is entering an exit ramp, the controller may determine that a turn signal should be displayed.

In step 860, if the controller in step 850 determined that a turn signal should be displayed, indicators 622 of the platform 600A are activated to display the appropriate signal.

Figure 9:
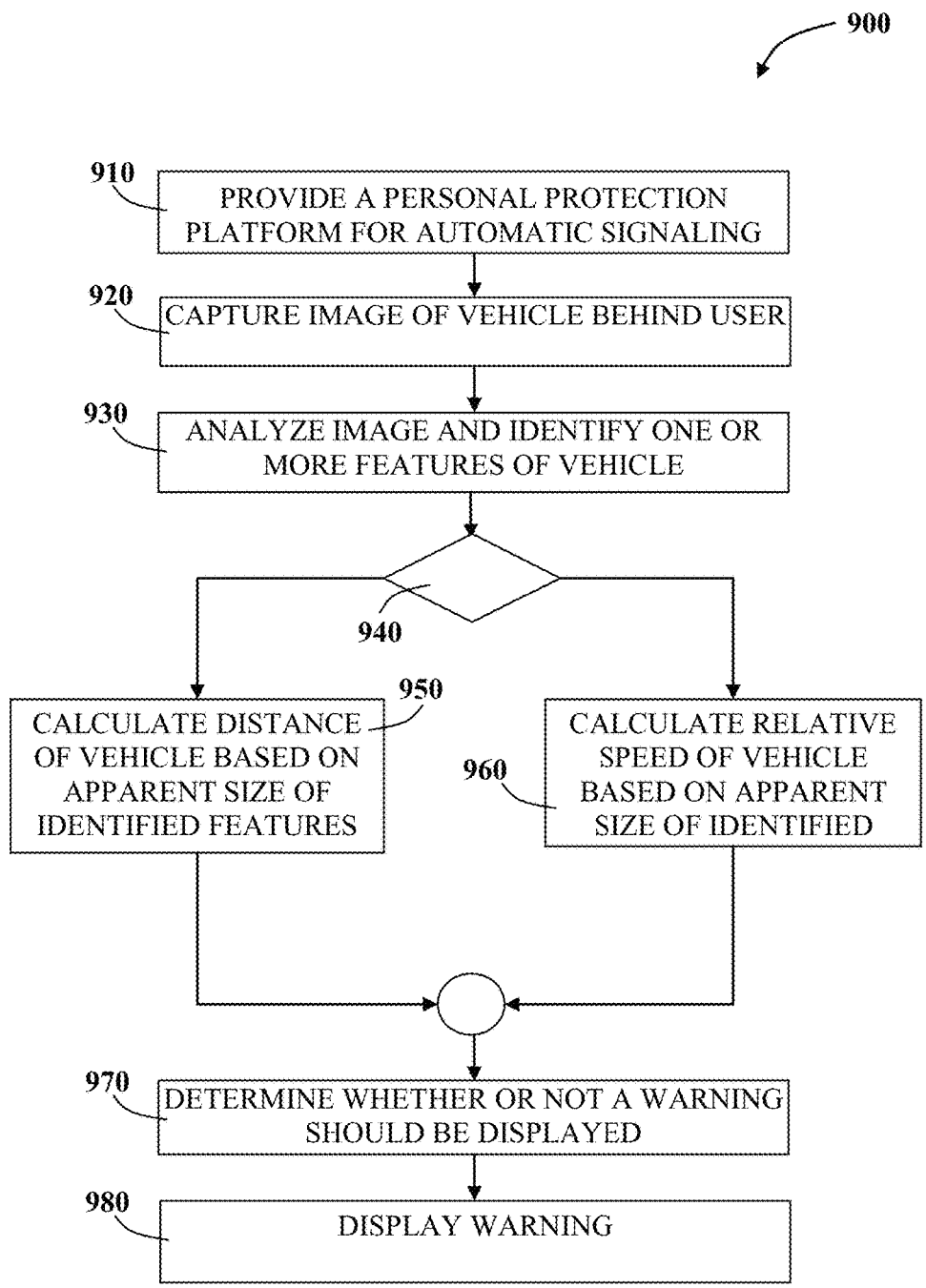
FIG. 9 illustrates a method used in the personal security platform for indicating a warning.

Reference is now made to FIG. 9, another method 900 may be provided, whereby the platform 600A indicates a warning to vehicles therebehind on its display 620.

In step 910 of the method 900, a platform 600A is provided, such as described above with reference to FIGS. 6A and 6B. In particular, the platform 600A may be provided with a controller, a display 620 with indicators 622, and a camera 640.

In step 920, the camera 640 captures an image of a vehicle behind the user.

In step 930, the controller analyzes the image captured by the camera, and identifies one or more features of the vehicle therebehind.

In decision step 940, the controller chooses to determine whether to assess the distance (in step 950 below) or speed (in step 960 below) of a vehicle approaching therebehind.

In step 950, the controller compares the identified features, and calculates its distance based on the apparent size thereof based on the captured image, and preloaded information relating to its actual size. For example, the controller may be preloaded with information relating to the actual size of a license plate. Information relating to the apparent size of the portion of the captured image corresponding to the license plate (such as the number of vertical and/or horizontal pixels thereof, and camera information) is used to calculate the distance the license plate would be to produce such an image.

In step 960, the controller compares the relative size of one or more of the same identified features in different frames captured by the camera 640. By comparing the change in size of these features, and taking into account the elapsed time between the captured frames, the controller calculates if the vehicle approaching from behind is accelerating, or maintaining its speed (e.g., when it should be slowing down), etc.

It will be appreciated that the method 900 may be provided without one of steps 950 and 960 (and without the decision step 940), and/or with steps 950 and 960 be performed in parallel, without departing from the scope of the presently disclosed subject matter, mutatis mutandis.

In step 970, the controller determines, based on the calculations performed in either or both of steps 950 and 960, whether a warning to vehicles therebehind should be displayed.

In step 980, if the controller in step 970 determined that a warning should be displayed, indicators 622 of the platform 600A are activated to display the appropriate signal.

Those skilled in the art to which this invention pertains will readily appreciate that numerous changes, variations and modifications can be made without departing from the scope of the invention mutatis mutandis.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims.

Additionally, the various embodiments set forth hereinabove are described in term of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A personal security platform for providing automatic security measures, said personal security platform comprising:

a wearable item comprising a micro-processor, a command signal generating unit, a communication interface, and a rear-facing display having a turn signal visible to an observer behind the wearer, said micro-processor configured to execute a software application module, said command signal generating unit configured to generate at least one command signal communicating via said communication interface for controlling at least one protecting agent, and said communication interface further operable to provide a communication channel to a remote device; and a location tracker module for tracking a location, said location tracker module comprising a satellite navigation system configured to provide location based data, wherein at least a first said personal protecting agent comprises said rear-facing display operable to receive said at least one command signal selected according to said location based data, thereby controlling said turn signal according to said at least one command signal, at least a second said personal protecting agent comprises an unmanned aerial vehicle (UAV), and said software application module is configured to communicate with at least said unmanned aerial vehicle (UAV) such that the software application module controls said UAV, and at least a third said personal protecting agent comprises an automatic notification interface operable to communicate with at least one external satellite navigation system such the wearer is rendered visible thereby.

2. The personal security platform of claim 1, wherein said wearable item comprises said location tracker module.

3. The personal security platform of claim 1, wherein said wearable item is configured to retrieve map data from an external source, based on data from said location tracking module.

4. The personal security platform of claim 1, wherein at least one said protecting agent is selected from one or more of: a front-facing display, at least one motion sensor and at least image capturing device.

5. The personal security platform of claim 4, wherein said front-facing display is visible to an observer before the user when wearing the wearable item, said rear-facing display and said front-facing display, each comprising one or more indicators.

6. The personal security platform of claim 4, wherein said at least one motion sensor is configured to determine at least one motion parameter associated with said user.

7. The personal security platform of claim 6, wherein said at least one motion sensor is selected from a group consisting of: an accelerometer, a tilt sensor, a proximity sensor and combinations thereof.

8. The personal security platform of claim 4, wherein said at least one image capturing device comprises at least one camera.

9. The personal security platform of claim 8, wherein said at least one camera is selected from a group of cameras consisting of a front camera, a back camera, a side camera and combinations thereof.

10. The personal security platform of claim 4, wherein said at least one image capturing device is operable to receive said at least one command signal thereby controlling the operation of said at least one image capturing device and provide at least one captured image.

11. The personal security platform of claim 1, further comprising a user interface comprising one or more activation interfaces.

12. The personal security platform of claim 11, wherein said activation interface comprises a manual device operable to transmit one or more manual commands to the command signal generating unit to generate said at least one command signal such that the personal security platform is manually activated.

13. The personal security platform of claim 12, wherein said manual device is selected from a group consisting of: a push button, a button, a lever, a switch, a handle, a knob and a pull cord.

14. The personal security platform of claim 11, wherein said activation interface comprise a voice sensitive microphone operable to transmit one or more voice commands to the command signal generating unit to generate said at least one command signal such that the wearable signaling system is voice activated.

15. The personal security platform of claim 1, wherein said software application module is configured to communicate with at least one said unmanned aerial vehicle (UAV) via said communication channel.

16. The personal security platform of claim 1, further comprising an emergency services module characterized by at least one feature selected from:

said emergency services module being operable to activate emergency calls according to a pre-configured emergency call list;

said emergency services module being operable to receive said at least one command signal thereby controlling the operation of at least one emergency service;

said emergency services module being operable to activate at least one flashlight of at least one said unmanned aerial vehicle (UAV) via said communication channel;

said emergency services module being operable to activate at least one speaker of at least one said unmanned aerial vehicle (UAV) via said communication channel;

said emergency services module being operable to activate said at least one emergency service automatically;

said emergency services module being operable to activate said at least one emergency service manually; and said emergency services module being operable to activate said at least one emergency service vocally.

* * * * *